Patented Nov. 1, 1927.

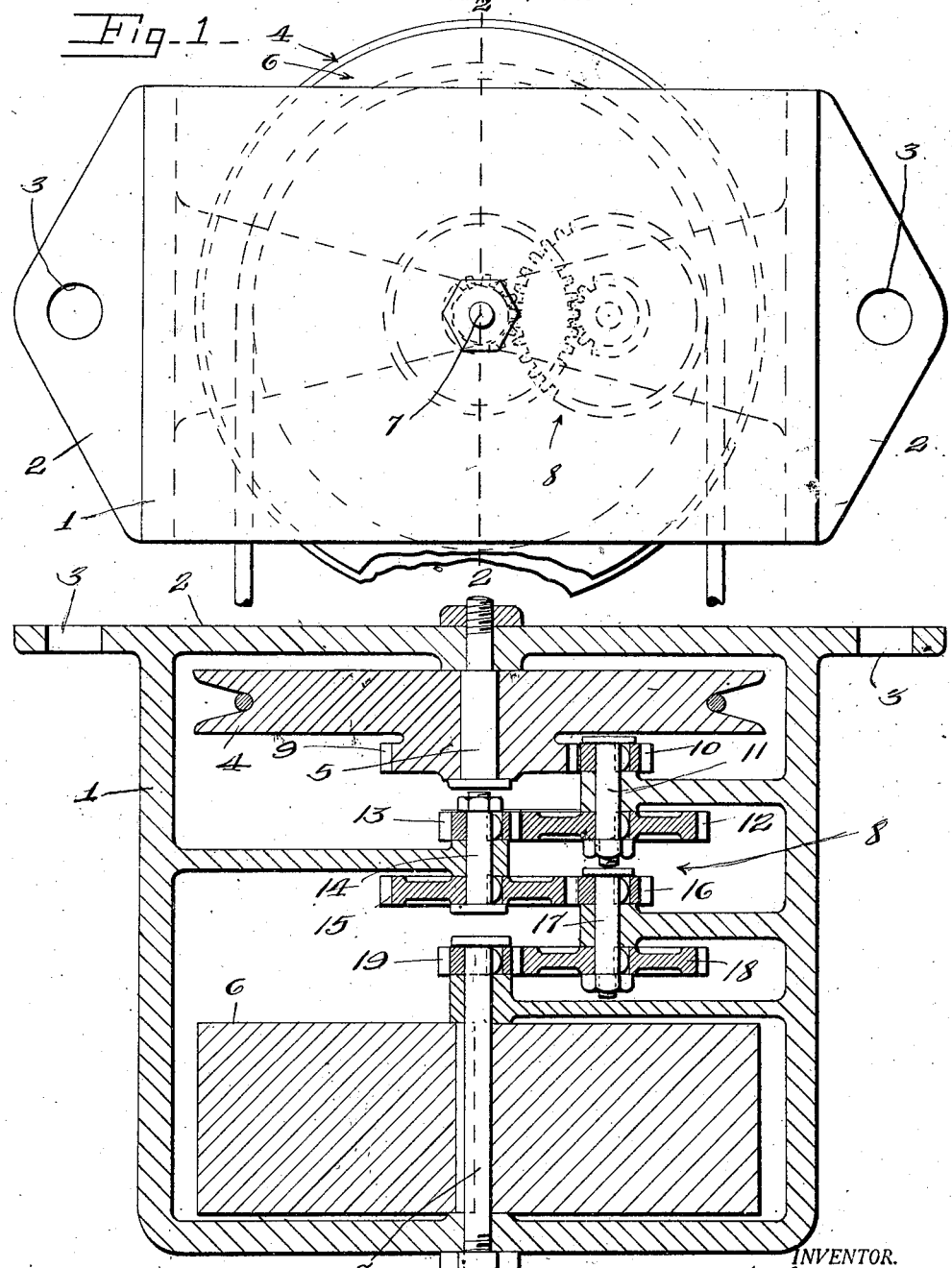

1,647,506

UNITED STATES PATENT OFFICE.

ARTHUR J. COUGHTRY, OF PORTSMOUTH, NEW HAMPSHIRE.

MOTION-RETARDING MECHANISM (FIRE ESCAPE).

Application filed July 15, 1925. Serial No. 43,767.

This invention has for its object what for convenience I have called motion retarding mechanism which is particularly useful in machines and appliances such as fire escapes, dumb waiters, tackles, etc., for lowering a load by the weight of the load for preventing undue acceleration of the speed of the load, and which is particularly simple and economical in construction and highly efficient and durable in use.

The invention consists in the novel features and in the combinations and constructions hereinafter set forth and claimed.

In describing this invention, reference is had to the accompanying drawing in which like characters designate corresponding parts in all the views.

Figure 1 is a front elevation of one form of machine embodying my invention.

Figure 2 is a sectional view on line 2—2, Fig. 1, parts being omitted.

This retarding mechanism comprises generally a suitable support or frame, a load carrying means comprising a winding drum or windlass mounted in the frame, and a cable arranged to wind on the drum to which the load is attached, a fly wheel carried by the frame and multiplying motion transmitting means between the load carrying means and the fly wheel and preferably between the drum and the fly wheel.

1 designates the frame which may be of any suitable form, size and construction, it being provided with means for attachment to a support, and it being here shown as having a base plate 2 formed with openings 3 through which it can be bolted to a wall or the like. The support as here shown is in the form of a box like casing projecting from the base plate 2.

4 designates the winding drum or pulley rotatably mounted in the frame, it being here illustrated as mounted upon a spindle or shaft 5 carried by the frame.

6 is the fly wheel mounted on a shaft 7 journalled in the frame preferably in axial alinement with the shaft 5.

8 designates generally the multiplying motion transmitting means between the pulley 4 and the fly wheel 6, this being shown as multiplying gearing. The gearing may be of any suitable form, size and construction, that here shown comprising a gear 9 arranged to rotate with the pulley 4 and concentric therewith and meshing with the pinion 10 carried by the rotatable shaft 11 journalled in the frame and having gearing 12 journalled in the frame thereon which meshes with the pinion 13 mounted on a rotatable shaft 14 journalled in the frame in alinement with the shafts 5 and 7. The shaft 14 having a gear 15 thereon meshing with the smaller pinion 16 carried by a rotatable shaft 17 journalled in the frame and preferably in alinement with the shaft 11, the shaft 17 having a gearing 18 thereon meshing with the pinion 19 on the shaft 7 on which the fly wheel is mounted. The gearing is such that a small motion of the pulley produces a relatively great motion of the fly wheel and hence a relatively great force applied to the pulley would be required to produce even a small acceleration of the fly wheel.

Hence, owing to the multiplying gearing and the fly wheel, the rate of speed of a load on the cable would remain practically constant without friction brakes and other devices which deteriorate.

What I claim is:—

A unitary structure comprising a frame, a winding drum mounted in the frame, a cable arranged to wind on the drum, a fly wheel mounted in the frame and motion multiplying and transmitting means between the winding drum and the fly wheel, the winding drum being arranged in axial alinement with the fly wheel.

In testimony whereof, I have hereunto signed my name, at Portsmouth, in the county of Rockingham and State of New Hampshire, this 7th day of July, 1925.

ARTHUR J. COUGHTRY.